(12) United States Patent
Wu

(10) Patent No.: US 7,243,734 B2
(45) Date of Patent: Jul. 17, 2007

(54) POWER TOOL WITH BATTERY POWER SUPPLY

(75) Inventor: Shuming Wu, Nanjing (CN)

(73) Assignee: Nanjing Chervon Industry Co., Ltd. (CN)

( * ) Notice: Subject to any disclaimer, the term of this patent is extended or adjusted under 35 U.S.C. 154(b) by 14 days.

(21) Appl. No.: 11/320,366

(22) Filed: Dec. 28, 2005

(65) Prior Publication Data
US 2006/0151189 A1 Jul. 13, 2006

(30) Foreign Application Priority Data
Jan. 10, 2005 (CN) .................. 2005 2 0069691

(51) Int. Cl.
*H02J 7/00* (2006.01)
*B25F 3/00* (2006.01)
(52) U.S. Cl. .................. 173/217; 310/36; 310/50; 320/115
(58) Field of Classification Search ................ 173/217, 173/213; 310/47, 36, 50; 320/115
See application file for complete search history.

(56) References Cited
U.S. PATENT DOCUMENTS

| | | | |
|---|---|---|---|
| 4,001,844 A * | 1/1977 | McClintock | ............... 396/304 |
| 4,288,733 A | 9/1981 | Bilanceri et al. | |
| 4,309,067 A | 1/1982 | Riley, Jr. | |
| D265,899 S | 8/1982 | House, II | |
| D265,985 S | 8/1982 | House, II | |
| 4,412,168 A | 10/1983 | Sell | |
| 4,563,629 A | 1/1986 | Keiper | |
| 4,576,880 A | 3/1986 | Verdier et al. | |
| 4,616,171 A | 10/1986 | Hernandez et al. | |
| 4,716,352 A | 12/1987 | Hurn et al. | |
| 4,751,452 A | 6/1988 | Kilmer et al. | |
| D299,640 S | 1/1989 | Price | |
| D300,920 S | 5/1989 | Gierke | |
| 4,835,410 A | 5/1989 | Bhagwat et al. | |
| D302,971 S | 8/1989 | Gierke | |
| 4,853,607 A | 8/1989 | Walter et al. | |
| 4,871,629 A | 10/1989 | Bunyea | |
| 4,880,713 A | 11/1989 | Levine | |
| 4,930,583 A | 6/1990 | Fushiya et al. | |
| 4,957,831 A | 9/1990 | Meredith et al. | |
| 4,986,369 A * | 1/1991 | Fushiya et al. | ............... 173/178 |
| 4,998,056 A | 3/1991 | Cole | |

(Continued)

*Primary Examiner*—Scott A. Smith
(74) *Attorney, Agent, or Firm*—McDermott Will & Emery LLP

(57) ABSTRACT

The present invention relates to a power tool with battery power supply comprising a main body and a detachable battery package which are connected with each other via a securing frame and a locking assembly. The securing frame includes a guiding device, an locking/unlocking button located on one of the main body and the battery package. An electrical connection is provided between a motor in the main body and the battery package, and includes a plurality of electrode connectors and corresponding electrode contact tabs. A mechanism for creating a non-mechanical force is located between the main body and the battery package for pushing the battery package out of the securing frame. With such a mechanism, when the battery package is required to be replaced by another one or detached for charging, it is merely necessary to press the unlocking button downward, and the battery package then automatically slides out of the securing frame via the effect of the force so as to facilitate detaching the battery package from the main body of the power tool.

20 Claims, 2 Drawing Sheets

U.S. PATENT DOCUMENTS

| | | |
|---|---|---|
| 5,013,993 A | 5/1991 | Bhagwat et al. |
| 5,043,650 A | 8/1991 | Bhagwat et al. |
| D321,338 S | 11/1991 | Sakamoto et al. |
| 5,065,082 A | 11/1991 | Fushiya |
| 5,095,259 A | 3/1992 | Bailey et al. |
| 5,144,217 A | 9/1992 | Gardner et al. |
| 5,148,094 A | 9/1992 | Parks et al. |
| 5,169,225 A | 12/1992 | Palm |
| 5,200,280 A | 4/1993 | Karasa |
| D335,277 S | 5/1993 | Hattori |
| 5,213,913 A | 5/1993 | Anthony, III et al. |
| 5,217,395 A | 6/1993 | Bailey et al. |
| 5,248,183 A * | 9/1993 | Gignac et al. ......... 297/188.16 |
| 5,248,928 A | 9/1993 | Gilmore |
| D342,479 S | 12/1993 | Kimata |
| 5,268,630 A | 12/1993 | Bhagwat et al. |
| 5,289,101 A | 2/1994 | Furuta et al. |
| 5,311,949 A | 5/1994 | Chapin |
| D350,111 S | 8/1994 | Okumura |
| 5,346,453 A * | 9/1994 | Rivera-Bottzeck ............. 483/1 |
| 5,348,815 A | 9/1994 | Barker |
| 5,352,969 A | 10/1994 | Gilmore et al. |
| D352,698 S | 11/1994 | Okumura |
| 5,360,073 A | 11/1994 | Akazawa |
| 5,406,187 A | 4/1995 | Harrison |
| 5,441,828 A | 8/1995 | Akazawa |
| 5,449,996 A | 9/1995 | Matsumoto et al. |
| 5,449,997 A | 9/1995 | Gilmore et al. |
| 5,453,677 A | 9/1995 | Sakoh et al. |
| 5,465,196 A | 11/1995 | Hasenberg et al. |
| 5,467,005 A | 11/1995 | Matsumoto et al. |
| 5,489,484 A | 2/1996 | Wheeler et al. |
| 5,489,485 A | 2/1996 | Peot et al. |
| D368,067 S | 3/1996 | Okumura |
| D370,888 S | 6/1996 | Okumura |
| 5,544,274 A | 8/1996 | Walker et al. |
| 5,553,675 A * | 9/1996 | Pitzen et al. ................. 173/217 |
| 5,557,190 A | 9/1996 | Brotto |
| D376,579 S | 12/1996 | Bunyea et al. |
| 5,589,288 A | 12/1996 | Coulson et al. |
| 5,620,808 A | 4/1997 | Wheeler et al. |
| 5,633,096 A | 5/1997 | Hattori |
| 5,642,031 A | 6/1997 | Brotto |
| D382,451 S | 8/1997 | Kikuchi |
| 5,663,011 A | 9/1997 | Bunyea et al. |
| D384,639 S | 10/1997 | Kawakami et al. |
| 5,681,667 A | 10/1997 | Bunyea et al. |
| 5,685,080 A | 11/1997 | Amano et al. |
| D387,728 S | 12/1997 | Kawakami et al. |
| 5,706,541 A | 1/1998 | Gutelius et al. |
| 5,718,985 A | 2/1998 | Bunyea et al. |
| 5,725,304 A | 3/1998 | Inai |
| 5,736,837 A | 4/1998 | Noda |
| 5,757,163 A | 5/1998 | Brotto et al. |
| 5,769,657 A | 6/1998 | Kondo et al. |
| 5,783,930 A | 7/1998 | Albert et al. |
| 5,789,101 A | 8/1998 | Wheeler et al. |
| 5,792,573 A * | 8/1998 | Pitzen et al. ................... 429/97 |
| D397,991 S | 9/1998 | Kawakami et al. |
| 5,800,940 A | 9/1998 | Bunyea et al. |
| 5,809,653 A | 9/1998 | Everts et al. |
| D400,499 S | 11/1998 | Bunyea |
| D401,901 S | 12/1998 | Bunyea et al. |
| 5,874,825 A | 2/1999 | Brotto |
| 5,881,823 A * | 3/1999 | Kabatnik et al. ............ 173/217 |
| 5,896,024 A | 4/1999 | Bradus et al. |
| D409,976 S | 5/1999 | Buck |
| 5,902,080 A | 5/1999 | Kopras |
| 5,909,101 A | 6/1999 | Matsumoto et al. |
| 5,912,546 A | 6/1999 | Sakou et al. |
| 5,919,585 A | 7/1999 | Wheeler et al. |
| D412,485 S | 8/1999 | Kato et al. |
| 5,945,803 A | 8/1999 | Brotto et al. |
| 6,007,939 A | 12/1999 | Clowers |
| 6,007,940 A | 12/1999 | Spotnitz |
| 6,027,535 A | 2/2000 | Eberle et al. |
| D421,558 S | 3/2000 | Shigo et al. |
| 6,057,608 A | 5/2000 | Bailey, Jr. et al. |
| 6,066,938 A | 5/2000 | Hyodo et al. |
| 6,075,347 A | 6/2000 | Sakakibara |
| 6,106,971 A | 8/2000 | Spotnitz |
| 6,124,698 A | 9/2000 | Sakakibara |
| 6,139,359 A | 10/2000 | Fuhreck et al. |
| 6,168,881 B1 | 1/2001 | Fischer et al. |
| 6,172,487 B1 | 1/2001 | Brotto |
| 6,181,032 B1 | 1/2001 | Marshall et al. |
| 6,191,554 B1 | 2/2001 | Nakane et al. |
| 6,191,560 B1 | 2/2001 | Sakakibara |
| 6,204,640 B1 | 3/2001 | Sakakibara |
| 6,204,641 B1 | 3/2001 | Sakakibara |
| 6,223,835 B1 | 5/2001 | Habedank et al. |
| 6,225,786 B1 | 5/2001 | Muramatsu et al. |
| 6,275,009 B1 | 8/2001 | Sakakibara et al. |
| 6,278,261 B1 | 8/2001 | Sakakibara |
| 6,279,741 B1 | 8/2001 | Arvin |
| 6,286,609 B1 * | 9/2001 | Carrier et al. .................. 173/1 |
| 6,296,065 B1 | 10/2001 | Carrier |
| 6,304,058 B2 | 10/2001 | Watson et al. |
| 6,324,339 B1 | 11/2001 | Hudson et al. |
| 6,329,788 B1 | 12/2001 | Bailey, Jr. et al. |
| 6,346,793 B1 | 2/2002 | Shibata et al. |
| 6,350,149 B1 | 2/2002 | Nakane |
| 6,357,533 B1 | 3/2002 | Buchholz et al. |
| 6,362,596 B1 | 3/2002 | Brotto |
| 6,362,600 B2 | 3/2002 | Sakakibara |
| 6,373,228 B1 | 4/2002 | Sakakibara |
| 6,404,167 B1 | 6/2002 | Sakakibara |
| 6,412,572 B2 | 7/2002 | Habedank et al. |
| 6,433,517 B2 | 8/2002 | Sakakibara |
| 6,455,186 B1 | 9/2002 | Moores, Jr. et al. |
| 6,460,626 B2 | 10/2002 | Carrier |
| 6,476,584 B2 | 11/2002 | Sakakibara |
| 6,479,964 B2 * | 11/2002 | Woodroffe et al. ......... 320/115 |
| 6,489,752 B1 | 12/2002 | Watts et al. |
| 6,501,197 B1 | 12/2002 | Cornog et al. |
| 6,502,949 B1 | 1/2003 | Horiyama et al. |
| 6,504,341 B2 | 1/2003 | Brotto |
| 6,508,313 B1 | 1/2003 | Carney et al. |
| 6,515,451 B2 | 2/2003 | Watson et al. |
| 6,537,694 B1 | 3/2003 | Sugiura et al. |
| 6,562,509 B1 | 5/2003 | Eggert |
| 6,563,290 B2 | 5/2003 | Sakakibara et al. |
| 6,566,005 B1 | 5/2003 | Shimma et al. |
| 6,566,843 B2 | 5/2003 | Takano et al. |
| 6,573,621 B2 | 6/2003 | Neumann |
| 6,577,104 B2 | 6/2003 | Sakakibara |
| D477,811 S | 7/2003 | Niwa et al. |
| 6,597,572 B2 | 7/2003 | Nishikawa et al. |
| 6,603,288 B2 | 8/2003 | Sakakibara |
| D481,672 S | 11/2003 | Niwa et al. |
| 6,645,666 B1 | 11/2003 | Moores, Jr. et al. |
| 6,653,815 B2 | 11/2003 | Watson et al. |
| 6,675,912 B2 | 1/2004 | Carrier |
| D487,570 S | 3/2004 | Ito et al. |
| 6,727,679 B2 | 4/2004 | Kovarik et al. |
| 6,729,413 B2 | 5/2004 | Turner et al. |
| 6,729,414 B2 | 5/2004 | Cooper et al. |
| D491,521 S | 6/2004 | Yamamoto |
| 6,742,601 B2 | 6/2004 | Numata |
| 6,765,317 B2 | 7/2004 | Chu |
| 6,771,043 B2 | 8/2004 | Matsunaga et al. |
| 6,783,886 B1 | 8/2004 | Sakakibara et al. |
| 6,796,475 B2 * | 9/2004 | Adams .......................... 227/2 |
| 6,840,335 B1 | 1/2005 | Wu |

| | | |
|---|---|---|
| 6,876,173 B2 | 4/2005 | Mastaler et al. |
| 6,889,439 B2 | 5/2005 | Koukal et al. |
| 6,968,908 B2 * | 11/2005 | Tokunaga et al. ............ 173/181 |
| 6,979,155 B2 * | 12/2005 | Dils et al. ..................... 408/16 |
| 2001/0000945 A1 | 5/2001 | Watson et al. |
| 2001/0015579 A1 | 8/2001 | Nakagawa et al. |
| 2002/0011819 A1 | 1/2002 | Watson et al. |
| 2002/0034682 A1 | 3/2002 | Moores, Jr. et al. |
| 2002/0125857 A1 | 9/2002 | Mastaler et al. |
| 2002/0153146 A1 | 10/2002 | Dueitt |
| 2002/0158516 A1 | 10/2002 | Nishikawa et al. |
| 2002/0197527 A1 | 12/2002 | Moores, Jr. et al. |
| 2003/0027037 A1 | 2/2003 | Moores, Jr. et al. |
| 2003/0085243 A1 | 5/2003 | Kahn |
| 2003/0096158 A1 | 5/2003 | Takano et al. |
| 2003/0102844 A1 | 6/2003 | Bailey |
| 2003/0117108 A1 | 6/2003 | Watson et al. |
| 2004/0160212 A1 | 8/2004 | Mastaler et al. |
| 2004/0174138 A1 | 9/2004 | Moores, Jr. et al. |
| 2004/0175610 A1 | 9/2004 | Moores, Jr. et al. |
| 2004/0196002 A1 | 10/2004 | Watson et al. |
| 2005/0073282 A1 | 4/2005 | Carrier et al. |
| 2005/0077878 A1 | 4/2005 | Carrier et al. |
| 2005/0110458 A1 | 5/2005 | Seman, Jr. et al. |

* cited by examiner

POWER TOOL WITH BATTERY POWER SUPPLY

CROSS-REFERENCE TO RELATED APPLICATIONS

This application claims priority under 35 U.S.C. § 119 to Chinese Application No. 200520069691.7, filed on Jan. 10, 2005.

FEDERALLY SPONORED RESEARCH AD DEVELOPEMENT

None.

TECHNICAL FIELD

The invention relates to a power tool with a detachable power supply package and, more particularly, to the manner for attaching and detaching the power supply package of the power tool.

BACKGROUND OF THE INVENTION

It is common for a power a power tool to be provided with battery packages. During the operating of a power tool, unavoidable vibrations require an especially tight connection between the battery package and the power tool to prevent the connection from being loosened. However, the tight connection between the battery package and the power tool makes it difficult for the battery package to be detached from the power tool.

A cordless electric drill with a resilient mechanism for detaching the battery package from a power tool is disclosed in U.S. Patent Application Publication No. 2003/0039880. The resilient pushing mechanism comprises a pair of springs so that the battery package being unlocked can be disengaged and pushed away from the power tool via the resilient force of the pair of pressed springs. One disadvantage of such a mechanism is its complicated mechanical structure. Furthermore, over time, the resiliency of the springs may be reduced with the result of the reduced function of the resilient pushing mechanism due to degradation of material properties over time and as a result of continued use.

The present invention is provided to solve the problems discussed above and other problems, and to provide advantages and aspects not provided by prior battery packages for power tools. A full discussion of the features and advantages of the present invention is deferred to the following detailed description, which proceeds with reference to the accompanying drawings.

SUMMARY OF THE INVENTION

It is an object of the present invention is to provide a power tool with a battery package for power supply that has a durable and reliable attachment mechanism for the battery package.

According to the present invention, the power tool with battery power supply comprises a main body and a detachable battery package. The main body and detachable battery package are connected with each other by a securing frame and a locking device. The securing frame includes a guiding device and a locking/unlocking button located on one of either the main body and the battery package. An electrical connection is provided between the main body and the battery package, and includes a series of electrode plugs or connectors and corresponding electrode contact tabs. A non-mechanical mechanism for creating a force is formed between the main body and the battery package for pushing the battery package out of the securing frame by effect of the biasing force. Preferably, the mechanism consists of at least two magnets (one disposed on the battery package and one disposed on the main body) aligned such that portions of the magnets having a like polarity are aligned adjacent to one another. Accordingly, the magnets repulse one another and create a non-mechanical force that urges the battery package out of engagement from the securing frame, and separates the electrodes and electrical connectors so that the electrical connection to the battery package is prevented.

With such a mechanism, when the battery package is required to be replaced by another one or detached for charging, it is merely necessary to press the unlocking button downward, and the battery package can then automatically slide out of the securing frame by the effect of the force created by the magnets having a like polarity. Because the force to disengage the battery package from the power tool is not created by elastic deformation of a tool component or material, the pushing mechanism and attachment mechanism of the present invention is durable, reliable, has a relatively simple mechanical structure and is easy to use.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

The preferred embodiments of the present invention, utilizing an electric drill as an example, are illuminated in more detail below with reference to the drawings.

DETAILED DESCRIPTION

Figure 1:
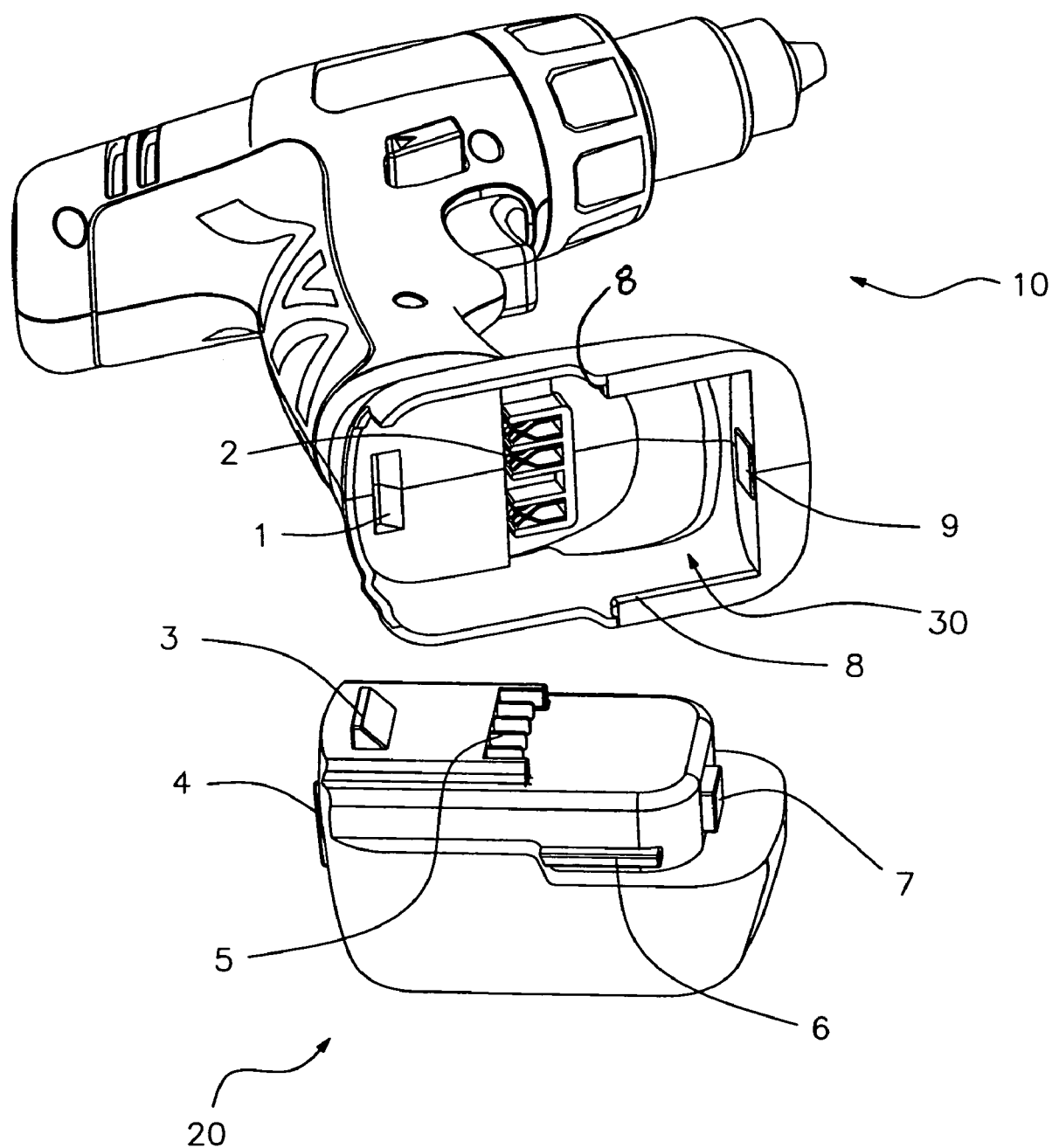
FIG. 1 is a perspective view of an electric drill according to a preferred embodiment of the present invention after its main body and battery package have been detached from each other.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
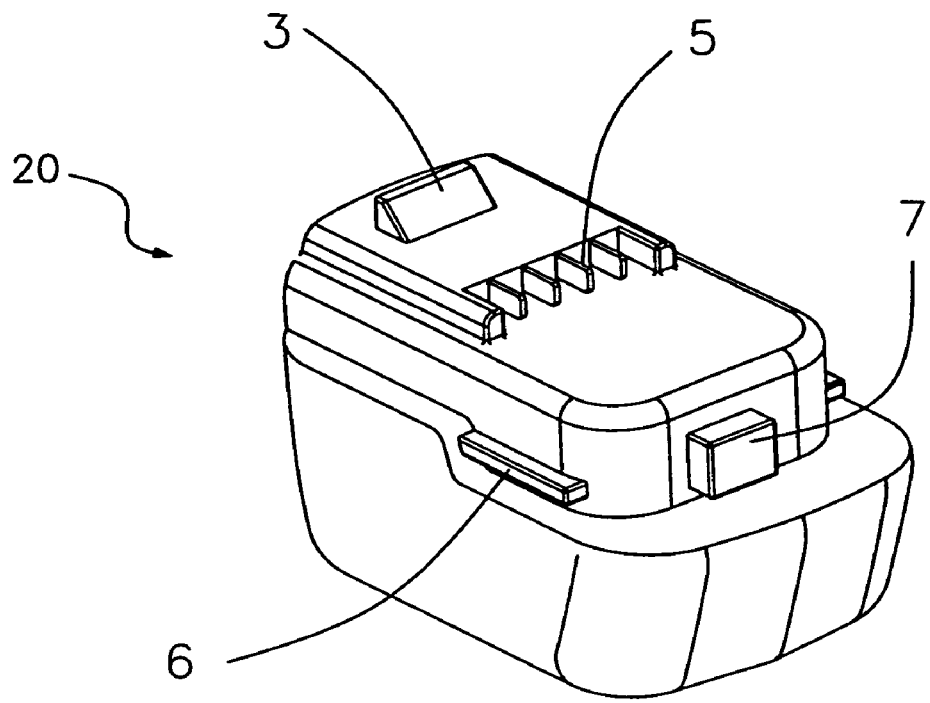
FIGS. 2 and 3 show perspective views in two different visual angles of the battery package shown in FIG. 1.
Figure 3:
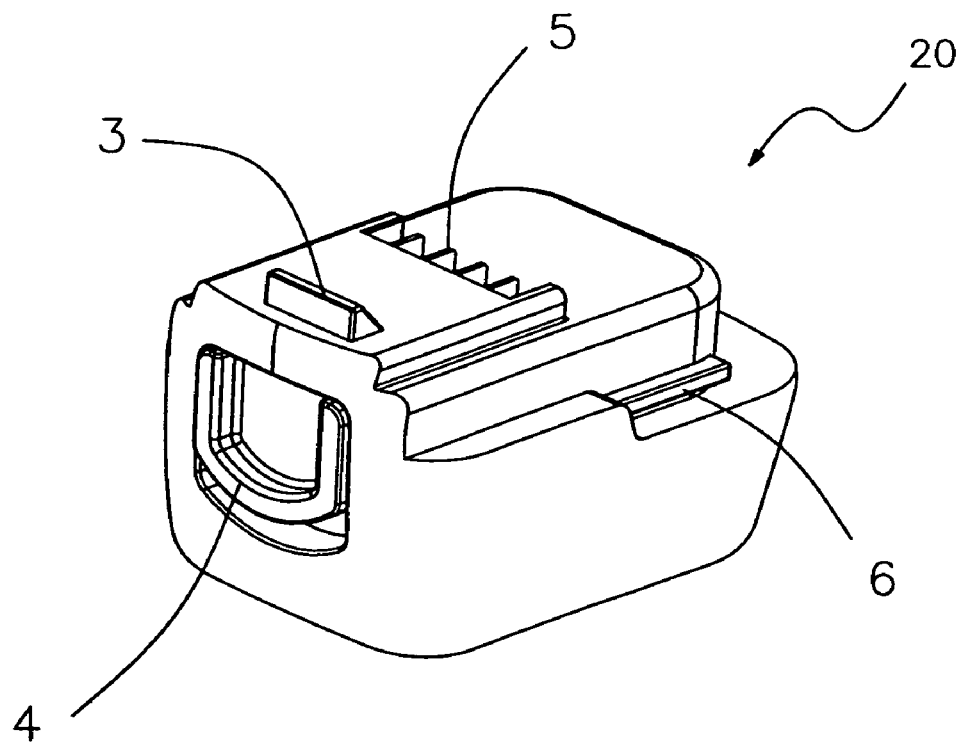

FIGS. 1 to 3 schematically show an electric drill according to a preferred embodiment of the present invention. However, it should be understood the battery power supply attachment mechanism of the present invention could be utilized with any suitable power tool. The power tool comprises a main body 10 and a detachable battery package 20. The main body 10 houses a motor (not shown) which is powered by the detachable battery package 20. The main body 10 comprises a securing frame 30 formed thereon or connected thereto for receiving and containing at least a portion of the battery package 20. FIG. 1 shows the securing frame 30 at the bottom of a handle for an electric drill. It will be understood by those having ordinary skill in the art that the securing frame 30 can be positioned on any convenient accessible part of the main body of the power tool. The securing frame 30 comprises a pair of opposing sliding slots 8 fittable with guiding bars 6 of the battery package 20 so that the battery package 20 can slide into the securing frame 30 via the guiding bars 6 sliding along the sliding slots 8. Thus, when the detachable battery package 20 is connected to the main body 10, the guiding bars 6 are engaged with the sliding slots 8 of the frame 30. The battery package 20 further comprises a latch 3 formed thereon and connected to an externally accessible locking/unlocking button or knob 4. A resilient member (not shown) is provided on a bottom of the latch 3, with the result that the latch 3 can move up and down because of the effect of external pressure provided with the movement of the locking/unlocking button or knob 4. The main body 10 comprises a recess 1, for engageably receiving the latch 3. Accordingly, in order to install the battery package 20 to the main body 10, the guiding bars 6 slide into the securing frame 30 along the sliding slots 8. The latch 3 is pressed downward at the same time in a first, retracted position (via externally accessible button or knob 4), and when the battery package 20 reaches a predetermined position, the latch 3 becomes properly aligned with the recess 1. The latch 3 is moved into a second, protruding position (via externally button or knob 4) and extends into and engages the side walls of the recess 1 so that locking between the main body 10 and the battery package 20 is achieved.

The securing frame 30 can be provided alternatively on the battery package 20, and at the same time the latch 3 and the recess 1 can also be provided alternatively on the main body 10 and the battery package 20, respectively. Further, the sliding slots 8 and the guiding bars 6 described above may extend the entire length of the battery package 20 and/or the securing frame 30. In this manner, the whole battery package 20 can slide into the securing frame 30.

Referring to FIG. 1, the battery package 20 comprises a plurality of electrode plugs 5 formed thereon, while the main body 10 comprises a corresponding plurality of electrode contact tabs or connectors 2. When the battery package 20 is connected to the main body 10, the electrode plugs 5 are inserted between the electrode contact tabs 2, thereby forming an electrical connection, and electrically connecting the motor in the main body 10 with the power supply 20. The electrical connection between the battery package 20 and the main body 10 is not limited to the inserting manner shown in the drawings, but may be any other alternative connection manner that is commonly known in the industry.

The non-mechanical mechanism or assembly for creating a force to push the battery package 20 out of the securing frame 30 will now be explained with reference to the preferred embodiment shown in FIGS. 1–3. The battery package 20 and the main body 10 comprise a magnet 7 and a magnet 9, respectively. Magnet 7 is attached or formed a surface of the battery package 20. Magnet 9 is attached or formed on a surface of the main body 10. The magnets are positioned such that when the battery package 20 is slid into the securing frame 30, the magnets 7, 9 are adjacent to each other, and preferably in a face-to-face relationship to one another. The magnets 7 and 9 are preferably located in planes substantially perpendicular to the plane in which the sliding slot 8 resides. The faces (or ends) of the magnets 7, 9 opposite each other have the same polarity, resulting in the creation of a repulsive force between the magnets 7, 9. Thus, the magnetic repulsive force produced between magnets 7, 9 is substantially parallel to the sliding slots 8.

When the detachable battery package 20 is connected to the main body 10, the electrodes 5 are inserted into the electrical connectors 2. Because the latch 3 is engaged with recess 1, the repulsive force cannot pull the electrodes 5 out of electrical contact with the electrical connectors 2.

When the detachable battery package 20 is to be removed from the main body 10 of the power tool, the user moves the latch 3 from the first position, where it is engaged in the slot 1 of the main body 10 and electrodes 5 are electrically connected to electrical connectors 2, to the second position, where the latch 3 is disengaged from the slot 1. The electrical connection between the electrodes 5 and the connectors 2 is broken or prevented because the repulsive force created by the non-mechanical biasing assembly (i.e., the repulsive force created between like polarity portions of magnets 7, 9) forces the battery package 20 to slide away from the main body 10 via guiding bars 6 and opposed sliding slots 8. As a result, the electrical connection between the electrodes 5 and the connectors 2 is eliminated.

The above detailed description and drawings are merely the embodiments of the present invention utilizing the electric drill as an example. Obviously, the above connection and pushing manner of the battery package can also be applied to other power tools with battery power supply. The above-mentioned specific installing manner of the battery package and the positions of the magnets are not only. And the modification, variation and alteration thereof without creation are also regarded as within the scope and fair meaning of the present invention.

While the specific embodiments have been illustrated and described, numerous modifications come to mind without significantly departing from the spirit of the invention, and the scope of protection is only limited by the scope of the accompanying Claims.

What is claimed is:

1. A power tool with battery power supply, comprising
a main body having a motor, a frame for receiving a detachable battery package and a recess;
a latch disposed on the detachable battery package, the latch being moveable between a first position and a second position, wherein when the latch is in the first position the latch is engaged in the slot of the main body and an electrical connection is maintained between the detachable battery package and the motor;
means for creating a repulsive force between the main body and the detachable battery package, wherein when the latch is in the second position the latch is disengaged from the slot and the repulsive force causes the electrical connection between the detachable battery package and the motor to be eliminated.

2. The power tool of claim 1, wherein the detachable battery package has an externally accessible member connected to the latch.

3. The power tool of claim 1, wherein the means for creating a repulsive force comprises at least two magnets.

4. The power tool of claim 3, wherein one of the magnets is connected to the detachable battery package and one of the magnets is connected to the main body.

5. The power tool of claim 3, wherein the two magnets have portions with a like polarity positioned adjacent to one another.

6. The power tool of claim 1, wherein the detachable battery package has a pair of guide bars that engage a pair of slots in the main body when the detachable battery package is connected to the main body.

7. The power tool of claim 1, wherein the main body has a plurality of electrical connectors and the detachable battery package has a corresponding plurality of electrodes.

8. The power tool of claim 7, wherein when the latch is positioned in the slot, the electrodes of the detachable battery package are inserted in the electrical connectors of the main body.

9. A power tool with battery power supply, comprising
a main body having a motor and a frame with a slot for receiving a detachable battery package;
a recess formed in the main body;
the detachable battery package having an inner portion and an outer portion, the inner portion having a latch connected to a knob on the outer portion of the detachable battery package;
a non-mechanical biasing assembly which exerts a force on the detachable battery package such that when the detachable battery package is in a first position, the latch is engaged in the recess formed in the main body an electrical connection is formed between electrodes on the detachable battery package and electrical connectors on the main body, and when the detachable battery package is in a second position, the latch is disengaged from the recess and the force on the detachable battery package prevents the electrodes on the detachable battery package from being in electrical contact with the electrical connectors on the main body.

10. The power tool of claim 9, wherein the non-mechanical biasing assembly comprises first and second magnets having a like polarity.

11. The power tool of claim 10, wherein the first magnet is disposed on the main body and the second magnet is disposed on the detachable battery package.

12. The power tool of claim 10, wherein the like polarity of the first and second magnets creates a repulsive force.

13. The power tool of claim 12, wherein the repulsive force is substantially parallel to the slot in the frame.

14. The power tool of claim 9, wherein the detachable battery package has a guide bar that slidingly engages the slot of the frame when the detachable battery package is connected to the main body.

15. The power tool of claim 14, wherein the non-mechanical biasing force is substantially parallel to the guide bar and slot engagement.

16. A power tool with power supply, comprising:
a main body and a detachable power supply package, one of which includes a frame for detachably receiving the other;
a motor contained in the main body;
a recess formed in one of either the main body or the power supply package, the other one of either the main body or the power supply package having a latch being moveable between a first position and a second position, wherein when the latch is in the first position the latch is engaged in the recess and an electrical connection is maintained between the motor and the power supply package; and
a non-mechanical biasing assembly which exerts a repulsive force on the power supply package such that when the latch is in the second position, the latch is disengaged from the recess and the repulsive force causes the electrical connection between the detachable power supply and the motor to be eliminated.

17. The power tool of claim 16, wherein the detachable power supply package has an externally accessible member connected to the latch.

18. The power tool of claim 16, wherein the non-mechanical biasing assembly comprises at least two magnets, one magnet being connected to the power supply package and the other magnet being connected to the main body, wherein the at least two magnets have portions with a like polarity positioned adjacent to one another.

19. The power tool of claim 16, wherein the detachable power supply package has a pair of guide bars that engage a pair of slots in the main body when the detachable power supply package is connected to the main body.

20. The power tool of claim 19, wherein the repulsive force exerted by the non-mechanical biasing assembly is substantially parallel to the slots in the main body.

* * * * *